(12) United States Patent
Chankaramangalam et al.

(10) Patent No.: US 12,508,744 B2
(45) Date of Patent: Dec. 30, 2025

(54) SYSTEMS AND METHODS FOR MOLD CREATION

(71) Applicant: Wichita State University, Wichita, KS (US)

(72) Inventors: Jeswin Joseph Chankaramangalam, Wichita, KS (US); Timothy Arthur Chavez, Wichita, KS (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 12 days.

(21) Appl. No.: 18/492,242

(22) Filed: Oct. 23, 2023

(65) Prior Publication Data

US 2024/0051188 A1     Feb. 15, 2024

Related U.S. Application Data

(62) Division of application No. 17/118,822, filed on Dec. 11, 2020, now abandoned.

(Continued)

(51) Int. Cl.
*B29C 33/00* (2006.01)
*B29C 33/30* (2006.01)
*B29C 33/38* (2006.01)
*B29C 64/393* (2017.01)
*B33Y 10/00* (2015.01)

(Continued)

(52) U.S. Cl.
CPC ........ *B29C 33/0088* (2013.01); *B29C 33/302* (2013.01); *B29C 33/3835* (2013.01); *B29C 33/3842* (2013.01); *B29C 64/393* (2017.08); *B33Y 10/00* (2014.12); *B33Y 50/02* (2014.12); *B33Y 80/00* (2014.12)

(58) Field of Classification Search
CPC .......................... B29C 33/302; B29C 33/3842
See application file for complete search history.

(56) References Cited

U.S. PATENT DOCUMENTS

| 4,822,436 A | 4/1989 | Callis et al. |
| 5,035,098 A | 7/1991 | Newsom |

(Continued)

FOREIGN PATENT DOCUMENTS

FR    2206161 A1    6/1974

OTHER PUBLICATIONS

Chandler, David L., "Assembler robots make large structures from little pieces," TechXplore, Oct. 16, 2019, 4 pages, Massachusetts Institute of Technology, US.

*Primary Examiner* — John J DeRusso
(74) *Attorney, Agent, or Firm* — Stinson LLP

(57) ABSTRACT

A mold for use in molding a surface of a component is formed from separate building blocks that are assembled together so that mold surface segments associated with each of the building blocks line up to form one contiguous mold surface that corresponds with the shape of the mold. The building blocks can be formed to have integral formations for connecting them together. The building blocks can be formed by modeling the contiguous mold surface, dividing this first mold model into sections which define discrete building block models, and then forming each building block separately based on the discrete building block models. For instance, the individual block models can be assigned to different additive manufacturing machines and then later be assembled together at a final location.

16 Claims, 6 Drawing Sheets

Related U.S. Application Data

(60) Provisional application No. 62/947,609, filed on Dec. 13, 2019.

(51) Int. Cl.
    *B33Y 50/02*     (2015.01)
    *B33Y 80/00*     (2015.01)

(56) References Cited

U.S. PATENT DOCUMENTS

| | | |
|---|---|---|
| 5,616,293 A | 4/1997 | Ashtiani-Zarandi et al. |
| 5,641,448 A | 6/1997 | Yeung et al. |
| 6,663,811 B2 * | 12/2003 | Shen ............... B29C 33/3857 |
| | | 264/220 |
| 2005/0173839 A1 | 8/2005 | Crump et al. |
| 2008/0099955 A1 | 5/2008 | Cleaver |
| 2016/0067904 A1 * | 3/2016 | Eleftheriou ........... B29C 33/302 |
| | | 425/522 |
| 2018/0009134 A1 | 1/2018 | Berben et al. |
| 2019/0264453 A1 | 8/2019 | Petri |
| 2020/0023558 A1 | 1/2020 | Soshi |
| 2021/0137153 A1 | 5/2021 | Rubinsky et al. |
| 2021/0148124 A1 * | 5/2021 | Kurth ..................... E04G 9/05 |
| 2022/0032508 A1 | 2/2022 | Huang et al. |

\* cited by examiner

SYSTEMS AND METHODS FOR MOLD CREATION

PRIORITY STATEMENT

This patent application is a division of U.S. patent application Ser. No. 17/118,822, filed Dec. 11, 2020, which claims priority to U.S. Provisional Patent Application No. 62/947,609, entitled SYSTEMS AND METHODS FOR MOLD CREATION, and filed on Dec. 13, 2019, each of which is hereby incorporated by reference in its entirety.

FIELD OF DISCLOSURE

The present disclosure generally relates to manufacturing molds, and more specifically, to systems and methods for creating molds for use in in the manufacturing of components therefrom.

BACKGROUND

Molding is the process of manufacturing by shaping material, such as carbon fiber, plastic, etc., using a rigid frame called a mold. Generally, the material is placed in the mold to harden or set, thereby adopting the shape of the mold. Molding is particularly well suited for creating components with curved exteriors, such as an airplane wing, a vehicle body panel, an architectural panel, or a structural frame member.

Molding can be used to shape generally any size of material, the only limit on the size being the size of the mold. Due to the large costs and specialized equipment required to create large molds, alternatives to molding are being developed. For example, as one alternative, a plurality of mobile robots equipped with three dimensional (3-D) printers are simultaneously used to create the large component.

SUMMARY

In one aspect, a mold for use in molding a component comprises a plurality of separately formed building blocks assembled together to form the mold. At least some of the building blocks have mold surface segments. The assembled building blocks arrange the mold surface segments to form at least one contiguous mold surface that corresponds with a shape of the component such that the component can be formed in the mold against the at least one contiguous mold surface.

In another aspect, a method for creating a mold for use in molding a surface of a component comprises receiving a three-dimensional component model of at least the surface of the component. A three-dimensional mold model of a mold having a mold surface that is a negative of the surface of the component is created via at least one processor. The three-dimensional mold model is divided into a plurality of three-dimensional building block models via the at least one processor. Each three-dimensional building block model corresponds to a respective portion of the three-dimensional mold model. A building block for each of the three-dimensional building block models is physically constructed. The physically constructed building blocks are coupled together to form the mold.

In still another embodiment, a building block for use in constructing a mold for molding a component comprises a mold surface segment sized and shaped to receive a material thereon to shape a portion of a surface of the component. The mold surface segment corresponds to a shape of the portion of the surface of the component. The building block further comprises an integral formation for connecting the building block to at least one other building block to construct the mold from a plurality of building blocks.

In yet another aspect, a method for creating a mold for use in molding a surface of a component comprises creating digital representations of a plurality of building blocks. The digital representations of the plurality of building blocks are assigned to a plurality of additive manufacturing machines. Each of the building blocks is constructed using the additive manufacturing machine to which the respective digital representation was assigned. The building blocks are collected in a single location. The building blocks are assembled together to form the mold.

Other aspects and features will be apparent hereinafter.

BRIEF DESCRIPTION OF THE DRAWINGS

Corresponding reference characters indicate corresponding parts throughout the drawings.

DETAILED DESCRIPTION

Figure 1:
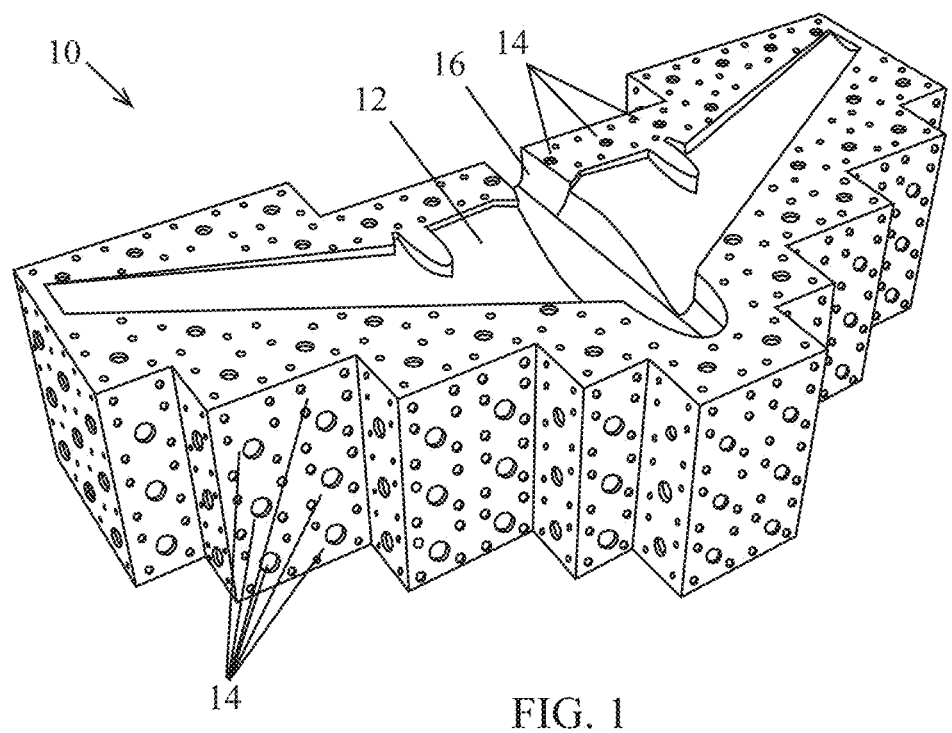
FIG. 1 is a perspective of a mold constructed from building blocks according to one embodiment of the present disclosure.
Figure 2:
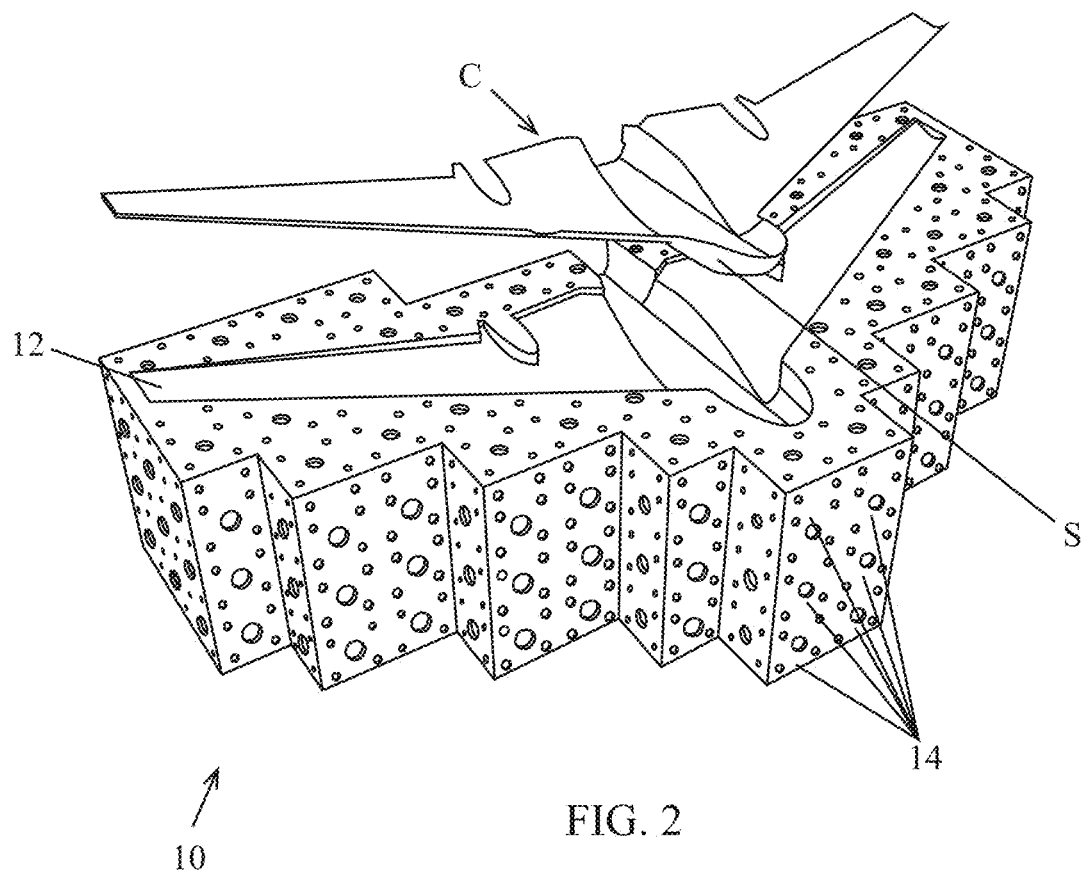
FIG. 2 is a perspective of the mold with a component formed using the mold spaced therefrom.

Referring to FIGS. 1 and 2, one embodiment of a mold for use in molding a component is generally indicated at reference numeral 10. The mold 10 is used in a molding process to shape or form a surface S, such as an exterior surface, of a component C, such as an airplane wing (or portion thereof). It is understood the component C formed via the mold 10 can be anything and can have generally any shape. The mold 10 can be used in generally any molding process such as casting, blow molding, compression molding, injection molding, laminating, matrix molding, rotational molding, thermoforming, vacuum forming, etc., which are all generally known in the art. Using the mold 10 in other molding processes is within the scope of the present disclosure. Generally, molding involves placing a material, such as plastic, carbon fiber, etc., into the mold and then moving the material against the surfaces of the mold to shape the material into the final shape of the component C. Once the material sets (e.g., dries, cures, hardens, solidifies), the now formed component C is removed from the mold, having a shape that is the negative or inverse of the shape of the mold.

The mold 10 has a mold surface 12 that corresponds to the shape of the component C such that the component can be formed in the mold against the mold surface. Specifically, the mold surface 12 is the negative of the shape of the component C, such that when the material forming the component C is received in the mold and pressed (e.g., moved) against the mold surface, the pressed material takes the shape of the component C. It is understood the mold surface 12 can have generally any shape. In the illustrated embodiment, the mold surface 12 is shaped to form a portion of an aircraft's wing and the component C formed by the mold 10 is a portion of the aircraft's wing.

Referring to FIGS. 1-4, the mold 10 is made of a plurality of separately formed building blocks 14 assembled together to form the mold. Any number of building blocks 14 can be used to construct the mold 10. For example, ten or more, 100 or more, a 1,000 or more or 10,000 or more building blocks 14 can be used to form the mold 10. At least some of the building blocks 14 have mold surface segments 16 (FIG. 1) (broadly, at least one mold surface segment). The mold surface segment 16 is a portion or section of the mold surface 12. The mold surface segment 16 is sized and shaped to receive the material thereon to shape a portion of the surface S of the component C. Accordingly, each mold surface segment 16 corresponds to the shape of a portion of the surface S of the component C. When the building blocks 14 are assembled to form the mold 14, the assembled building blocks arrange the mold surface segments 16 to form the contiguous mold surface 12 (broadly, at least one contiguous mold surface). Accordingly, at least some of the building blocks 14 have mold surface segments 16 that are in side-by-side engagement in the assembled mold 10. When assembled, adjacent mold surface segments 16 (e.g., building blocks 14) are in close tolerance with one another such that the joint formed there-between is relatively smooth (e.g., negligible to no gap). However, to further provide a smooth transition between adjacent mold surface segments 16, a covering or coating (not shown), such as a silicon based spray, can be applied to the mold surface 12 before the molding process to make it easier to remove the component C from the mold 10 and smooth the joints between adjacent mold surface segments.

Figure 3:
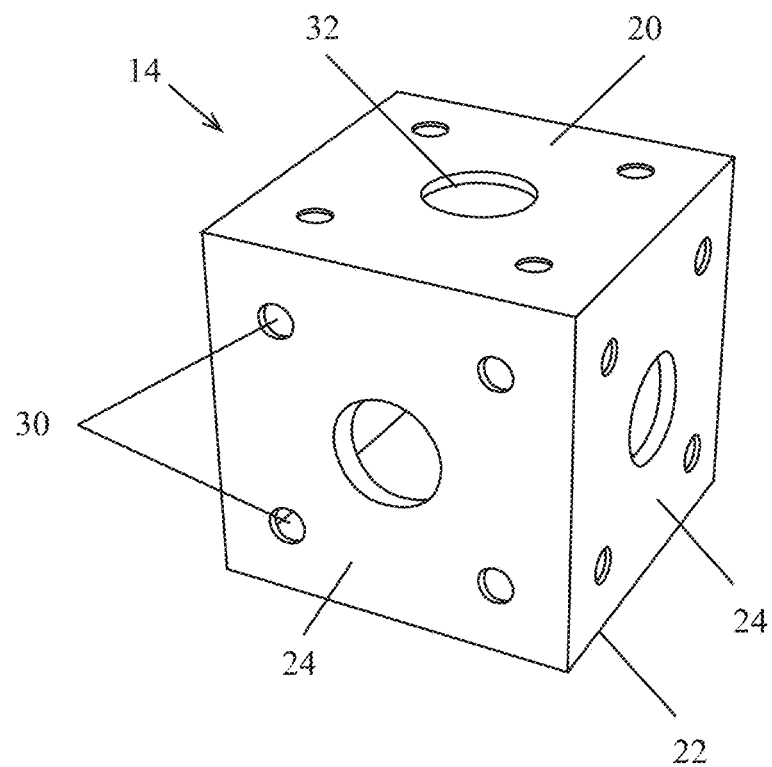
FIG. 3 is a perspective of a building block used to construct the mold according to one embodiment of the present disclosure.

In the illustrated embodiment, the assembled building blocks 14 only form one contiguous mold surface 12 in the mold 10, but is it understood the mold can include more than one mold surface such that the assembled building blocks form more than one contiguous mold surface (e.g., a plurality of spaced apart mold surfaces). Preferably, the mold 10 includes two types of building blocks 14: (1) building blocks which include at least one mold surface segment 16 (e.g., mold building blocks) and (2) building blocks which do not include any mold surface segments (e.g., support building blocks). These support building blocks 14 may be used to support mold building blocks which have mold surface segments 16 and otherwise strengthen and reinforce the mold 10. FIG. 3 illustrates a building block 14 which does not include a mold surface segment 16 (e.g., a support building block). In an embodiment, the building blocks are formed to have unique identifiers (e.g., numbers, schematic position indicators) that indicate where the building blocks are positioned in relation to the other building blocks in the mold. For example, the blocks are marked with an indication of the order in which each block must be laid down to assemble the mold in sequence.

Referring to FIG. 3, each building block 14 includes a top 20, a bottom 22 and a plurality of sides 24 that extend heightwise from the bottom to the top. Of course, some of the building blocks 14 also include one or more mold surface segments 16. These mold surface segments 16 define another exterior surface of the building block and can extend from the top 20, bottom 22 and/or one or more sides 24 of the building block. The exact arrangement of the mold surface segment 16 in relation to the top 20, the bottom 22 and the one or more sides 24 will depend on the shape of the mold surface segment and the position of the mold surface segment in relation to the entire mold surface 12 (e.g., the position of the building block in the mold 10). It is conceivable that, depending on the particular shape of the mold surface 12, that one or more building blocks 14 may only have one side 24 or no sides (e.g., the mold surface segment 16 extends upward or downward from the entire perimeter of the bottom 22 or top 20, respectively). Generally speaking, each building block 14 will have at least one of a top 20, a bottom 22 or a side 24.

Figure 4:
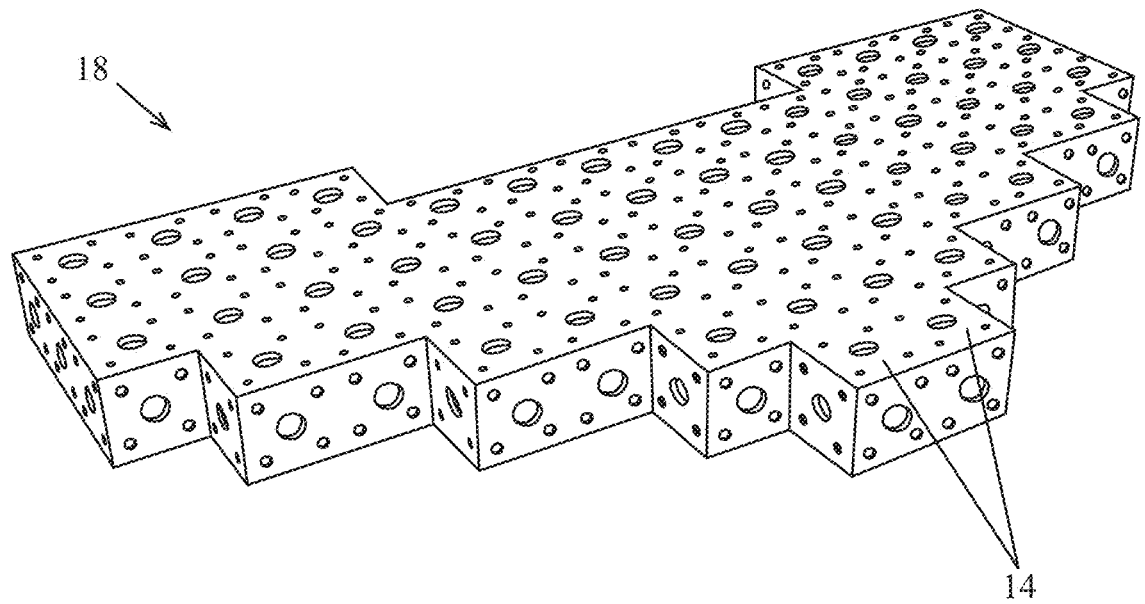
FIG. 4 is a perspective of a plurality of building blocks assembled together to form one layer of the mold.

Preferably, each building block 14 is sized and shape to fit within an imaginary hexahedron, such as a cube. It is understood that other shapes are within the scope of the present disclosure. In the illustrated embodiment, each building block 14 is sized and shaped to fit within an imaginary cube. This way the building blocks 14 generally fit within the same exterior envelope (e.g., height, width, and length), allowing the building blocks to be easily assembled together in a block arrangement. For example, the block arrangement of one layer 18 of building blocks 14 for the mold 10 is shown in FIG. 4. In this case, the layer 18 is the base or bottom layer of the mold 10 and supports additional layers of building blocks 14 thereon. Generally speaking, each support building block 14 will preferably have the same exterior dimensions which will match the dimensions of the imaginary hexahedron. Generally speaking, each mold building block 14 with have at least one exterior dimension (e.g., height, width and/or depth) which is identical to an exterior dimension of another building block (either mold or support building block). However, there can be exceptions as required to form the particular shape of the mold surface 12. In other words, each building block 14 of a mold 10 has a height, width or length (e.g., exterior dimension) that is no larger than a height, width or length, respectively, of at least one other building block. This ensure all the building blocks 14 can be assembled in a block arrangement to form the mold 10.

In an embodiment, the mold 10 may be constructed from building blocks 14 sized and shaped to fit within different sizes of imaginary hexahedrons. In this embodiment, there is a base imaginary hexahedron that defines the minimum length, width, and height for a building block envelope. Other larger hexahedrons having one or more exterior dimensions that is a multiple (e.g., 1, 2, 3, 4, etc.) of the corresponding exterior dimension of the base imaginary hexahedron are also used. For example, in a mold with a base imaginary hexahedron comprising a 10×10×10 cm cube (length-by-width-by-height), building blocks in imaginary envelopes of e.g., 40×10×10, 40×40×20, 10×10×20, etc. could be used, depending on the size of various parts of the mold, the capabilities of the manufacturing equipment (e.g., additive manufacturing machines) on which each building block is made, etc. Using dimensional multiples of a base imaginary building block ensures all building blocks will still generally fit together in a similar manner to how interlocking children's bricks (e.g., Legos) of different sizes (e.g., standard bricks with different numbers of studs and/or differing heights) fit together even though the building blocks have different sizes, allowing the building blocks to be easily assembled together in a block arrangement.

As mentioned above, each building block is used to construct the mold 10 to be used for molding the component C. In order to construct the mold 10, each building block has at least one generally planar exterior surface (e.g., top, bottom or side) that engages the generally planar exterior surface of at least one other building block 14 when the building blocks are connected together. In the illustrated embodiment, the support building blocks 14 have six generally planar exterior surfaces (e.g., a top, a bottom and four side generally planar exterior surfaces). In the case of hexahedral block envelopes, the mold building blocks 14 will have up to six generally planar exterior surfaces which can be used for assembly, but the exact number and size of the generally planar exterior surfaces will depend upon the position of the mold building block 14 in the mold 10 and, therefore, the corresponding configuration of the mold surface segment 16 for that particular building block.

In order to assemble the building blocks 14 together, each building block includes an integral formation 30 (broadly, at least one integral formation) for connecting the building block to at least one other building block to construct the mold 10 from the plurality of building blocks. Generally, adjacent building blocks 14 (e.g., building blocks that engage and are coupled to one another) are connected together via the integral formation 30. Each integral formation 30 is located generally at or on the generally planar exterior surfaces of the building block 14. This way, the building blocks 14 can be connected together when the generally planar exterior surfaces of the building blocks 14 engage one another as the mold 10 is constructed. In the illustrated embodiment, the integral formations 30 are holes that can receive pins (not shown) to connect adjacent building blocks 14 together. In one embodiment, the pins are held in the holes 30 by friction fit so that the blocks 14 can be connected simply by registering the hole(s) of one block with a pin of another and then pushing the blocks together. Other integral formations besides holes for receiving pins are within the scope of the present disclosure. The mold 10 can also be disassembled. By disassembling the mold 10, certain building blocks 14, such as the support building blocks, can be reused to construct additional molds.

In one embodiment, each building block 14 is generally hollow or defines an interior cavity. The cavity reduces the overall amount of material required to construct each building block 14 and also permits molding equipment to be received in the building block. Each building block 14 generally includes one or more ports or openings 32 on the generally planar exterior surfaces to provide access to the cavity. Preferably, each port 32 of the building block 14 is configured to align with a port of another building block when the building blocks are assembled together. Each building block 14 may also include indicia (e.g., letters, numbers, symbols, etc.) to indicate the position of the building block in the mold 10, thereby facilitating assembly of the mold. In addition, one or more building blocks 14 may include a jack (not shown) to facilitate removal of the component C from the mold 10. In one embodiment, the building blocks 14 includes projections and grooves to precisely align each building block relative to adjacent building blocks. For example, the projection of one building block 14 can be received in and contact the base of a groove of an adjacent building block to align the two building blocks relative to one another. As a result, in this embodiment, the exterior surfaces of the building blocks 14 are not used for precision alignment between adjacent building blocks. In one embodiment, the building blocks 14 can include raised corner lands (e.g., protruding localized reinforcement for precision locating and joining of building blocks and accessories) on all the exterior surfaces of the building blocks to facilitate removal of the component C from the mold 10 and/or provide a location to add shims (not shown) when assembling the mold 10 to increase tolerances.

Each building block 14 is, preferably, formed from a single piece of material (e.g., one-piece construction). In one method of manufacture, each building block 14 is formed by additive manufacturing. For example, each building block 14 can be formed via a 3-D printer. Other ways of constructing the building blocks 14 are within the scope of the present disclosure.

Figure 5:
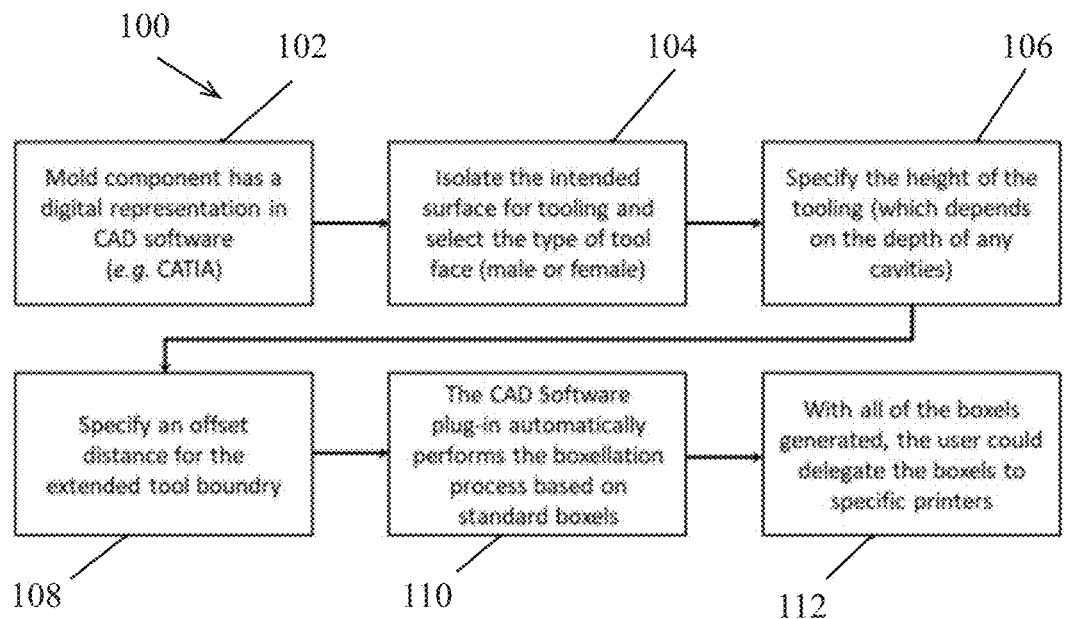
FIG. 5 is a flow chart illustrating a method for creating the building blocks according to one embodiment of the present disclosure.

Referring to FIGS. 5-11, one exemplary method for creating the mold 10 for use in molding the surface S of the component C will now be described. Referring to FIG. 5, a method for creating the building block 14 used to construct a mold 10 is generally indicated at 100. As will become apparent, a portion of the method 100 is performed on a computer (e.g., a laptop or desktop computer) having a processor (not shown) and a memory (not shown). The memory (broadly, a non-transitory computer-readable storage medium) stores processor-executable instructions for performing one or more of the aspects of the method 100, as described below. The processor executes the processor-executable instructions to perform said one or more aspects.

Figure 6:
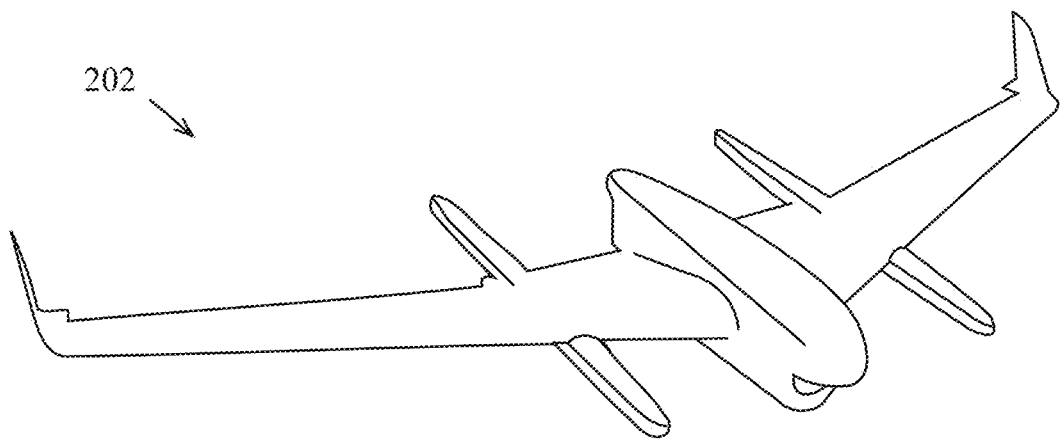
FIG. 6 is an illustration of a three-dimensional (3-D) component model used to create the mold of FIG. 1.
Figure 7:
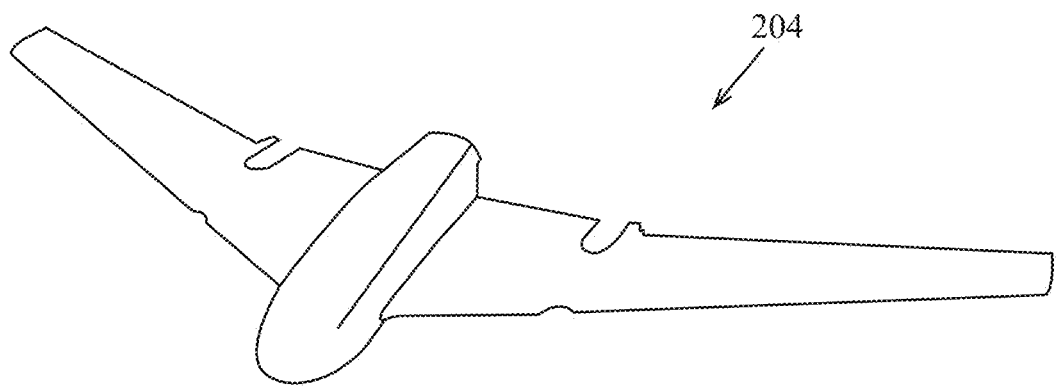
FIG. 7 is an illustration of the 3-D component model of FIG. 6 with a surface of the 3-D component model for molding isolated.

Still referring to FIGS. 5-11, first, at step 102, a 3-D component model 202 (broadly, a digital representation) is created of the component C to be molded. One such 3-D component model 202 is illustrated in FIG. 6. In this case the 3-D component model 202 is an airplane wing. The 3-D component model 202 may be created using conventional 3-D modeling software. This 3-D component model 202 is then received by (e.g., loaded on) a mold software program, being executed by the processor of the computer. At step 104, if the 3-D component model 202 is to be modeled in pieces or contains elements that are not to be molded, the 3-D component model surface 204 of the 3-D component model to be molded is isolated. FIG. 7 illustrates the isolated 3-D component model surface 204 of 3-D component model 202, which is the upper half of the airplane wing.

Figure 8:
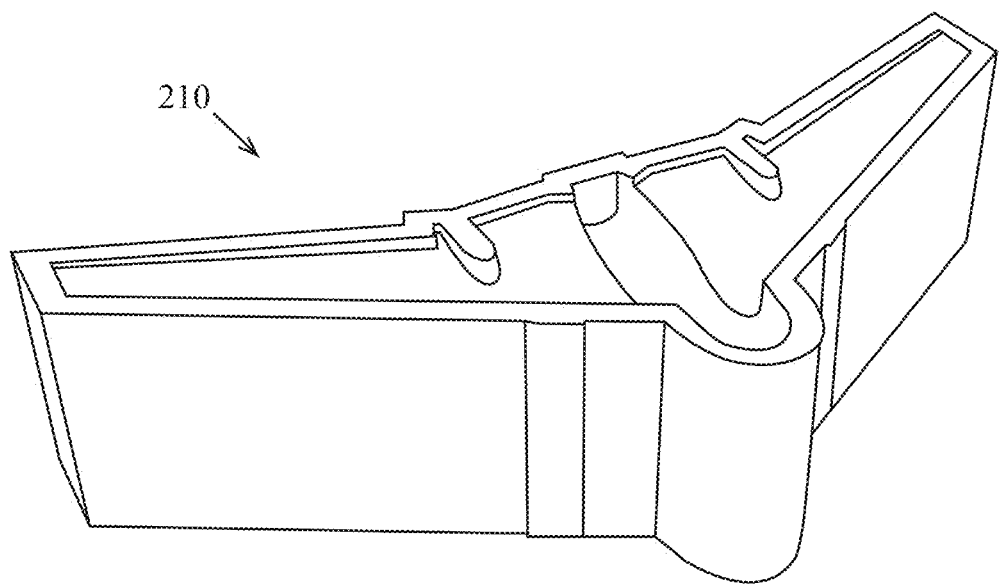
FIG. 8 is an illustration of a preliminary 3-D component mold model for the surface isolated in FIG. 7.
Figure 9:
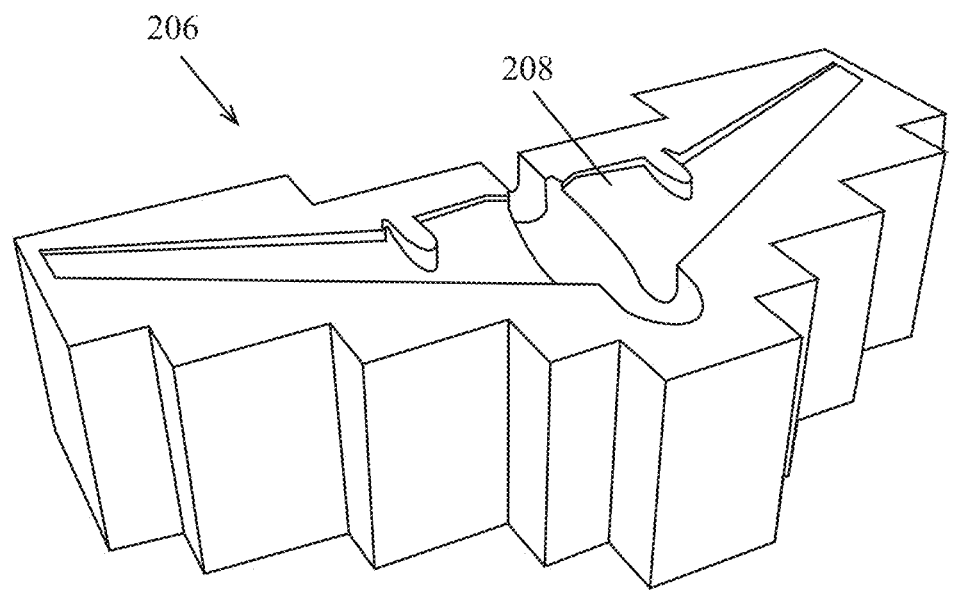
FIG. 9 is an illustration of a 3-D component mold model for the surface isolated in FIG. 7.

Next, a 3-D mold model 206 for the isolated 3-D component model surface 204 is created by the mold software program (e.g., via the processor). FIG. 9 illustrates an exemplary 3-D mold model 206 for the 3-D component model surface 204. The 3-D mold model 206 is a model (e.g., digital representation) of the mold 10 that will be created to form the component C. The 3-D mold model 206 includes a mold surface model 208 that corresponds to the mold surface 12 of the mold 10. The mold surface model 208 is a negative of the surface S of the component C and is formed by taking the negative of the 3-D component model surface 204. To create the 3-D mold model 206, first the negative of the 3-D component model surface 204 is taken. Next, at step 106, the user specifies a desired height of the mold 10. The specified height of the mold 10 needs to be greater than the depth of any cavities of the mold and, preferably, is also large enough so that a support layer 18 (FIG. 4) of building blocks 14 can be included in the mold 10. At step 108, the user specifies an offset or clearance distance for the mold 10 (e.g., a minimum distance between the mold surface 12 and an exterior side of the mold). From these input dimensions, a preliminary 3-D component mold model 210 is formed (FIG. 8). Finally, the 3-D component mold model 206 is formed by enlarging the sides and/or height of the preliminary 3-D component mold model 210 so that the 3-D component mold model has dimensions that are easily dividable by the minimum size of the building blocks (e.g., the preliminary 3-D component mold model is squared out to form the 3-D component mold model). The size of each building block 14 may be a standard size, such a 10-inch cube, or another size inputted by the user. With the size of the building blocks 14 determined, the mold software can automatically enlarge the preliminary 3-D component mold model 210 as needed. Other inputs affecting the geometric parameters of each building block 14, such as intended building block construction material, strength requirements, shape, fastening configuration, adjuster access, and ports 32 for equipment, may also be entered and taken into account when determining the size of the building blocks.

Figure 10:
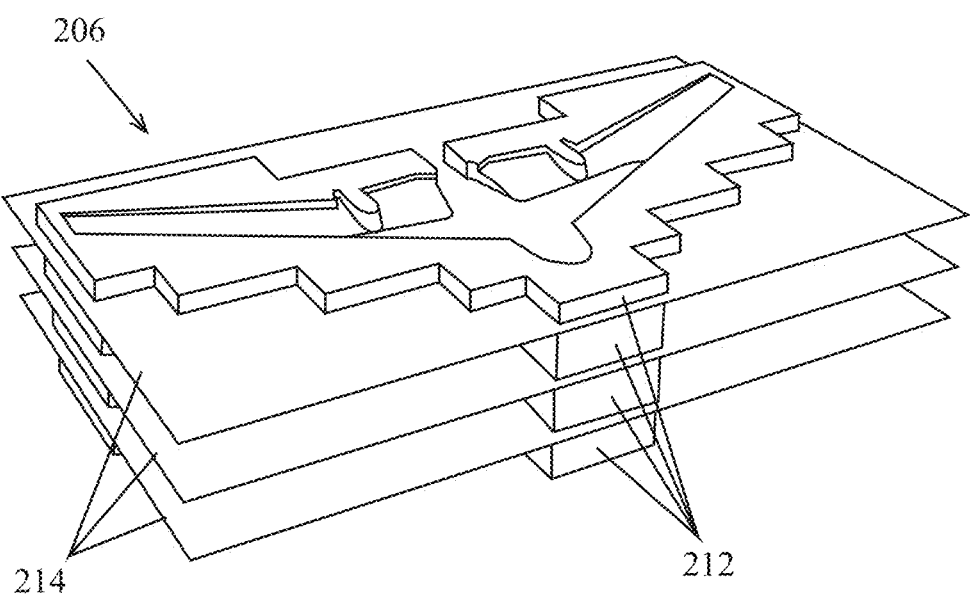
FIGS. 10 and 11 are illustrations of the 3-D component mold model being divided into a plurality of building blocks.
Figure 11:
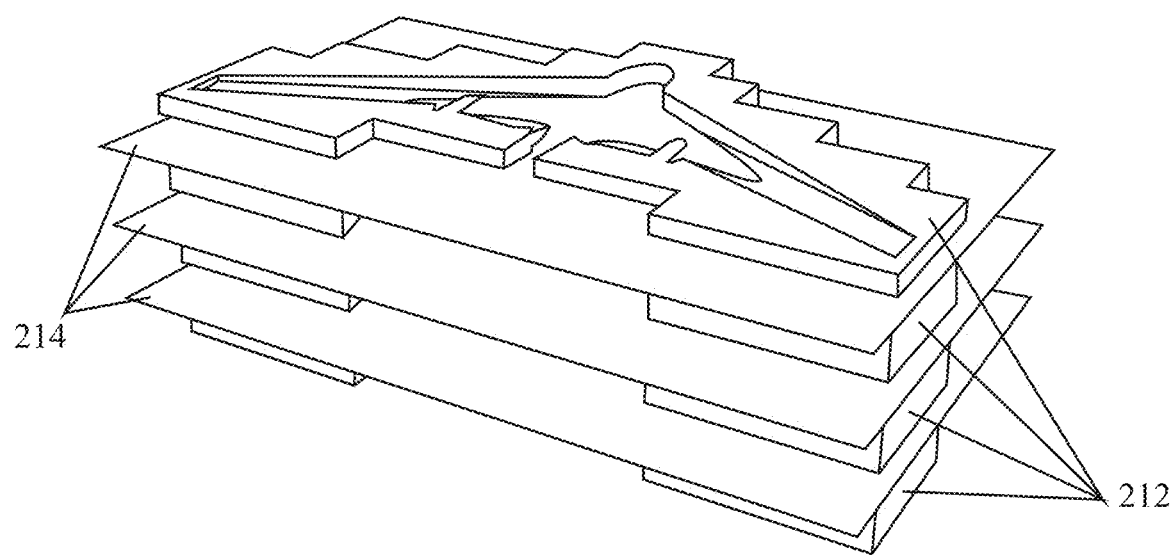

Once the 3-D component mold model 206 is created, at step 110, the 3-D component mold model is divided, by the mold software, into a plurality of 3-D building block models (not shown). Each 3-D building block model corresponds to a respective portion of the 3-D mold model 206. Each 3-D building block model is a model (e.g., digital representation) of a building block 14 that will be created to form the mold 10. Every feature of the building block 14 is represented in the 3-D building block model. In an embodiment, the 3-D building block model for each building block includes a 3-D impression of the indication of where the building block is to positioned in relation to the other building blocks in the mold, e.g., an indication of the point in the mold construction sequence at which the respective building block should be placed to assemble the mold. Accordingly, when appropriate, certain 3-D building block models will include at least one mold surface segment model (not shown) that corresponds to the mold surface segment 16 of the building block 14. In addition, the 3-D building block model will include representations of the exterior surfaces, integral formations 30, ports 32, etc. To divide the 3-D mold model 206 into the 3-D building block models, first the 3-D mold model is divided into a series of horizontal or planar layers 212 (FIGS. 10 and 11). In the illustrated embodiment, dicing planes 214 are shown to illustrate the dividing of the 3-D mold model 206 into the layers 212. The layers 212 preferably have the same height, which is equal to the height of the building block 14. If needed, one layer 212 (e.g., the top layer) can have a height less than the height of the other layers, as illustrated, to compensate for the 3-D mold model 206 having a height that is not a multiple of the set height of the building blocks 14. The layers 212 are then separated (FIG. 11) and each layer is divided into a plurality of 3-D building block models. This is done by dividing each layer 212 into hexahedrons having lengths and widths equal to the length and width, respectively, of the building blocks 14. As is apparent, where a 3-D building block model includes a mold surface segment model, the 3-D building block model may have exterior dimensions (e.g., height, length, width) equal to or less than the set exterior dimensions for the building blocks 14.

Once the 3-D mold model 206 is boxellated (e.g., divided up into hexahedrons or other building blocks) and all the 3-D building block models are generated, the building blocks 14 are physically created based on each 3-D building block model, at step 112. A building block 14 is physically constructed for each 3-D building block model. As mentioned above, this is preferably done by additive manufacturing such as by using 3-D printers (broadly, additive manufacturing machines). However, other types of automated manufacturing devices (e.g., multi-axis milling machines) can also be used in one or more embodiments. Preferably, many (e.g., a plurality of) additive manufacturing machines are used to construct the building blocks 14. Moreover, the plurality of additive manufacturing machines do not have to be in the same location but can be spread out over a region (e.g., city, state, country, or world). However, it is within the scope of the present disclosure that all the building blocks 14 are constructed sequentially by one additive manufacturing machine. The 3-D building block models are assigned to the plurality of additive manufacturing machines. Each 3-D building block model is assigned to one of the additive manufacturing machines. Each building block 14 is then constructed using the additive manufacturing machine to which the respective 3-D building block model was assigned to. Each additive manufacturing machine physically constructs a building block 14 based on a 3-D building block model assigned to that additive manufacturing machine. Once constructed, the building blocks 14 are collected at a single location. For example, the building blocks 14 can be constructed in different countries and then shipped to a single location. The building blocks 14 are then coupled (e.g., assembled) together to form the mold 10. For example, the building blocks 14 are placed down in sequence in accordance with the serialization information that is marked on the building blocks to form the mold.

Constructing a mold 10 as described herein provides several benefits. First, a single large mold is able to be constructed from many individual pieces (e.g., building blocks 14), eliminating the need for large mold-making equipment. Moreover, since the mold 10 is constructed from a plurality of relatively small building blocks 14, a mold of generally any size can be constructed. In addition, several manufacturing machines can be used to create the building blocks at the same time, reducing the total time to construct the mold. Furthermore, because building blocks can be manufactured at multiple locations remote from the ultimate site of the mold, the system can take advantage of idle manufacturing capacity (e.g., idle 3-D printers) across a wide geographic area. Increased security and secrecy of the shape of the molded component C is also possible. By sending the 3-D building block models to a plurality of different manufactures, each having additive manufacturing machines, no single manufacturer can determine the shape of the component C because no single manufacture possesses all the 3-D building block models needed to make the mold.

Although described in connection with an exemplary computing system environment, embodiments of the aspects of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well-known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the disclosure.

Embodiments of the aspects of the disclosure may be implemented with processor-executable instructions. The processor-executable instructions may be organized into one or more processor-executable components or modules on a tangible processor readable storage medium. Aspects of the disclosure may be implemented with any number and organization of such components or modules. For example, aspects of the disclosure are not limited to the specific processor-executable instructions or the specific components or modules illustrated in the figures and described herein. Other embodiments of the aspects of the disclosure may include different processor-executable instructions or components having more or less functionality than illustrated and described herein.

The order of execution or performance of the operations in embodiments of the aspects of the disclosure illustrated and described herein is not essential, unless otherwise specified. That is, the operations may be performed in any order, unless otherwise specified, and embodiments of the aspects of the disclosure may include additional or fewer operations than those disclosed herein. For example, it is contemplated that executing or performing a particular operation before, contemporaneously with, or after another operation is within the scope of aspects of the disclosure.

In view of the above, it will be seen that several advantageous results are obtained.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions and methods without departing from the scope of the invention, it is intended that all matter contained in the above description and shown in the accompanying drawings shall be interpreted as illustrative and not in a limiting sense.

The invention claimed is:

1. A method for creating a mold for use in molding a surface of a component, the method comprising:
    receiving a three-dimensional component model of at least the surface of the component;
    creating, via at least one processor, a three-dimensional mold model of a mold having a mold surface that is a negative of the surface of the component;
    dividing, via tat least one processor, the three-dimensional mold model into a plurality of three-dimensional building block models, each three-dimensional building block model corresponding to a respective portion of the three-dimensional mold model,
    configuring each of the three-dimensional block models to include a representation of an integral formation on at least one surface of the three-dimensional block models;
    additively manufacturing a building block for each of the three-dimensional building block models, wherein said additively manufacturing comprises additively manufacturing each building block to include an integral formation corresponding with the representation of an integral formation of the respective three-dimensional block model;
    coupling the additively manufactured building blocks together to form the mold by engaging the integral formations of the building blocks; and
    molding a plastic or carbon fiber part in the mold.

2. The method of claim 1, wherein said dividing comprises dividing the three-dimensional mold model into a plurality of horizontal layers and dividing each of the horizontal layers into a plurality of three-dimensional building block models, wherein the three-dimensional building block models of at least one layer comprise a plurality of adjoining mold surface segments and wherein the three-dimensional building block models of a base layer below said at least one layer are free of mold surface segments.

3. The method of claim 1, further comprising receiving user input specifying a height of the mold and wherein said creating the three-dimensional mold model comprises configuring the three-dimensional mold model to have at least the specified height.

4. The method of claim 3, further comprising receiving user input specifying an offset distance of the mold and wherein said creating the three-dimensional mold model comprises configuring the three-dimensional mold model to have at least the specified offset distance between the mold surface and an exterior side of the mold.

5. The method of claim 4, further comprising configuring the three-dimensional mold model to have at least one of a height greater than the specified height and an offset greater than the specified offset to accommodate an evenly divisible amount of three-dimensional block models having a predetermined shape and size.

6. The method of claim 1, further comprising configuring each of the three-dimensional block models to include a representation of an internal cavity and wherein said additively manufacturing comprises additively manufacturing the building blocks to define an internal cavity corresponding to the representation of the internal cavity, wherein the internal cavity reduces the overall amount of material required to construct each building block.

7. The method of claim 1, wherein the integral formations include grooves and complementary projections, the grooves and complementary projections configured so that the complementary projection of one additively manufactured building block can mate with the groove of an adjacent additively manufactured building block.

8. The method of claim 1, wherein the integral formations include pin holes configured for receiving separate coupling pins therein.

9. The method of claim 1, further comprising configuring each of the three-dimensional block models to include a representation of a unique identifier and marking each of the building blocks with the respective unique identifier.

10. A method for creating a mold for use in molding a surface of a component, the method comprising:
   creating digital representations of a plurality of building blocks;
   assigning the digital representations of the plurality of building blocks to a plurality of additive manufacturing machines, the additive manufacturing machines being distributed at spaced apart locations across a geographic area and belonging to different manufacturers;
   constructing each of the building blocks using the additive manufacturing machine to which the respective digital representation was assigned;
   shipping at least some of the building blocks from the locations of the respective additive manufacturing machines to a single location geographically spaced from said locations of the respective additive manufacturing machines; and
   assembling the building blocks together to form the mold at the single location.

11. The method of claim 10, further comprising sending only the digital representation of a subset of the individual building blocks to each one of said additive manufacturing machines at the spaced apart locations in order to maintain secrecy about a larger shape of the mold and the surface of the component.

12. The method of claim 10, wherein said creating digital representations comprises including in each digital representation a three-dimensional impression of an indication of where the building block is to be positioned in relation to the other blocks in the mold.

13. The method of claim 12, wherein said constructing each of the building blocks comprises using additive manufacturing to form the building blocks with real three-dimensional impressions indicating where the respective building blocks are to be positioned and wherein said assembling comprises assembling building blocks in an order indicated by the real three-dimensional impressions.

14. The method of claim 10, wherein said creating digital representations comprises including in each digital representation a three-dimensional impression of a unique identifier.

15. The method of claim 14, wherein said constructing each of the building blocks comprises using additive manufacturing to form the building blocks with real three-dimensional impressions of the respective unique identifiers and wherein said assembling comprises referencing the real three-dimensional impressions to determine an order of assembly.

16. A method for creating a mold for use in molding a surface of a component, the method comprising:
   receiving a three-dimensional component model of at least the surface of the component;
   creating, via at least one processor, a three-dimensional mold model of a mold having a mold surface that is a negative of the surface of the component;
   dividing, via the at least one processor, the three-dimensional mold model into a plurality of three-dimensional building block models, each three-dimensional building block model corresponding to a respective portion of the three-dimensional mold model;
   configuring each of the three-dimensional block models to include a representation of an interior void and at least one port in communication with the interior void opening through a surface of the three-dimensional block models;
   additively manufacturing a building block for each three-dimensional building block model, wherein said additively manufacturing comprises additively manufacturing each building block to include an interior void and at least one port corresponding with the representation of the respective three-dimensional building block model; and
   coupling the additively manufactured building blocks together to form the mold and such that at least one port of each building block aligns with the port of another building block.

* * * * *